UNITED STATES PATENT OFFICE.

GEORGE ERNEST CAMILLE DELAIRE, OF PARIS, FRANCE.

IMPROVEMENT IN ANILINE COLORS.

Specification forming part of Letters Patent No. 32,965, dated July 30, 1861.

*To all whom it may concern:*

Be it known that I, GEORGE ERNEST CAMILLE DELAIRE, of Paris, in the Empire of France, have invented a new mode of treating and combining certain coloring-matters for obtaining violet and blue colors for dyeing and printing; and I hereby declare the following to be a full, clear, and exact description of the same.

My invention consists in mixing with the aniline red—such as obtained in commerce or trade, and prepared according to the process or processes patented to Joseph Renard—pure aniline, in the manner and the properties hereinafter set forth, to obtain at will a blue and a violet coloring-matter.

To enable others skilled in the art to make and use my invention, I shall now proceed to describe the manner of treating and combining the said ingredients for the purposes set forth.

I take the ordinary aniline red, or the red obtained from aniline, purify and mix it with a quantity of pure aniline in equal proportions, or in quantity equal, or nearly so, to that of the red. This mixture is maintained during several hours at a temperature of about 165° centigrade. The matter that shall have thus become of a violet color is mixed with water and hydrochloric acid and brought to a boiling state. The excess of the aniline and the red matter that escaped transformation into violet is thereby dissolved and the residue that remains is the violet sought to be obtained. The violet of aniline is soluble in alcohol, acetic acid, spirit of wood, and boiling water slightly acidulated by acetic acid. It may, in the form of such solution, at once serve as a violet dye. If the violet residue obtained as above described be boiled successively in or with hydrochloric acid diluted with a small quantity of water, and be then washed in boiling water, a precipitate will be produced having a blue color, with a copper tinge on the surface of reflection.

The liquor obtained by the treatment above referred to from the violet matter with the hydrochloric acid and water contains some chlorhydrate of aniline and a red coloring-matter. This liquor should be precipitated by an alkali, so that the aniline may be recovered, and it is then purified by distillation.

Having thus ascertained the principle of my invention to lie in the formation of blue and violet by the reaction of the aniline red upon pure aniline at a suitable temperature, I have deduced therefrom that for the fuchsiachine or any other aniline red may be substituted certain products that are derived from aniline, and which are variously denominated in commerce—such as "indiasine," for instance; and, indeed, I have obtained the same results by heating the said indiasine and aniline to a temperature of 165° centigrade—*i. e.*, I have obtained a certain quantity of blue, and leaving aniline in excess; and, lastly, instead of taking either the first mixture above referred to, of aniline and the red of aniline, or the second mixture of aniline and the indiasine, if the aniline be caused to react upon any mixture of aniline with either of the ingredients that engender the red and the violet color, a beautiful blue color will be the product or result.

To separate the blue from the violet coloring substance several modes may be resorted to, of which I will mention the treatment of the product by any means capable of dissolving the resinous matter that accompanies the blue, or by treating the coloring matter by dissolving agents that leave the resinous substance in an insoluble state. The matter is finally obtained in the form of a solid substance of a more or less pure blue color. It is more or less soluble in water, according to its purity and freedom of resinous matter. It is soluble in alcohol, spirits, acetic acid, and is slightly soluble in ether, sulphate of carbon, &c.

The watery solution of the blue color is precipitated by hydrochloric acid, and all the salts having acid reaction with bases, and by the salts having an alkaline reaction. It is also precipitated by most of the neutral salts—such as the chloride of sodium, sulphate of soda, chromate of potash, &c. Again, it is dissolved in sulphuric acid, whereby a liquid is produced that is the less colored the more perfectly it is purified; but any addition of water will cause the color to reassume its intensity.

Having thus described my invention, what I claim as new is—

The method herein described of converting the red of aniline into the blue and violet of aniline by treating the former with pure aniline in the manner substantially as set forth.

In testimony whereof I have signed my name to this specification before two subscribing witnesses.

G. E. C. DELAIRE.

Witnesses:
  GEO. HUTTON,
  L. J. CAËS.